Jan. 31, 1967  KOSUKE MATSUKATA  3,301,726
METHOD AND APPARATUS FOR MAKING VARI-COLORED PARTICLE BOARD
Filed Nov. 14, 1962  4 Sheets-Sheet 4

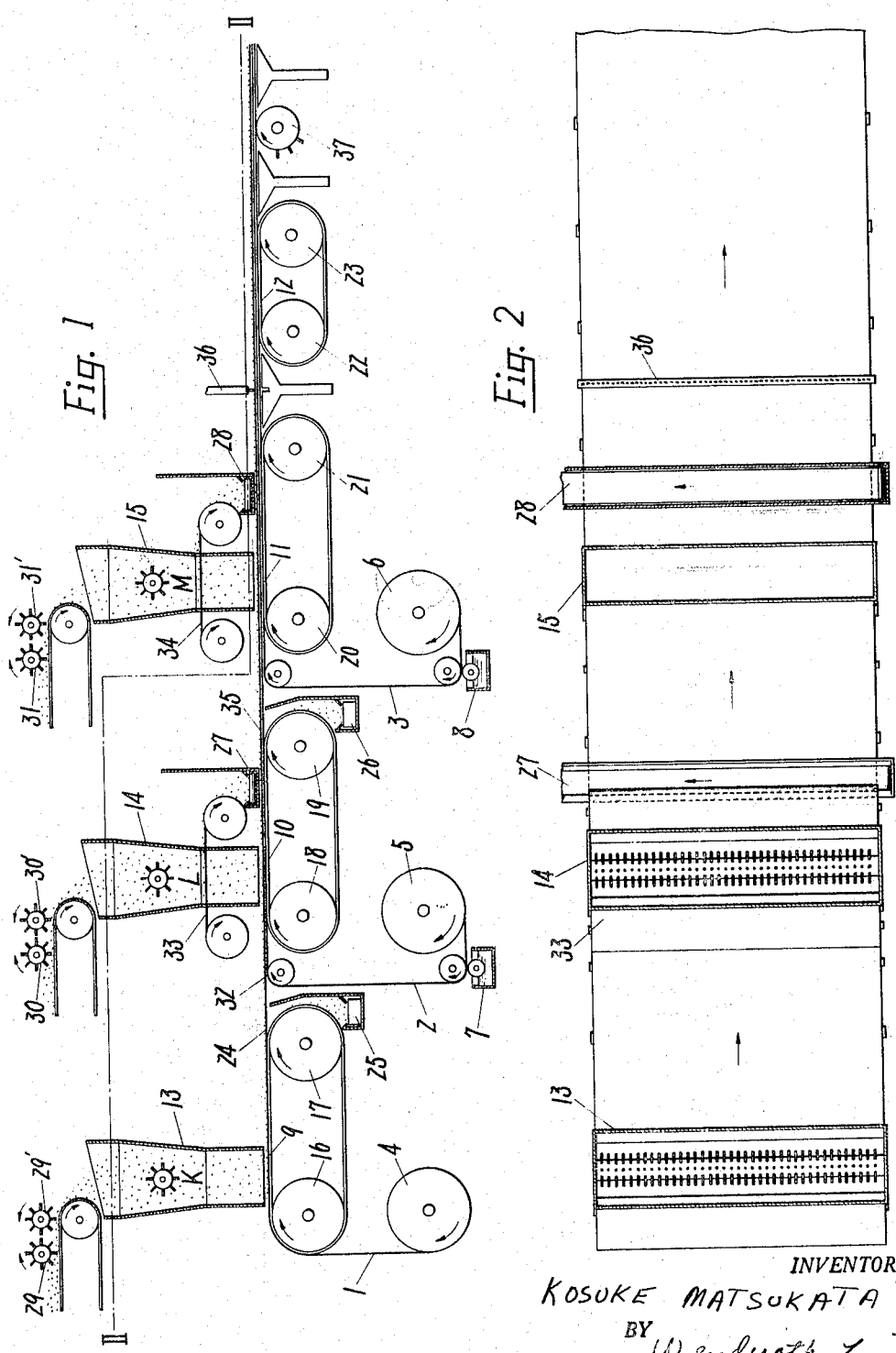

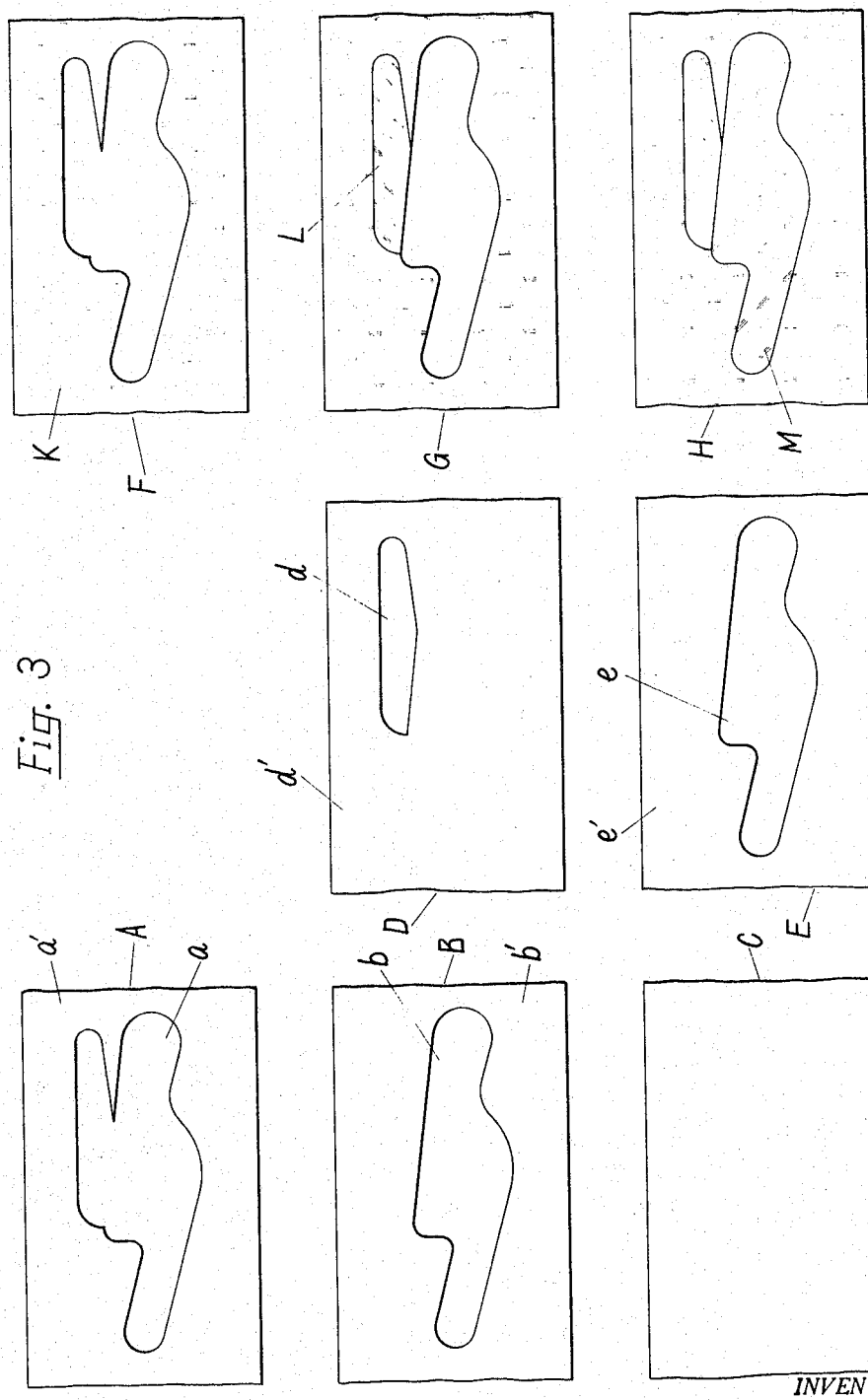

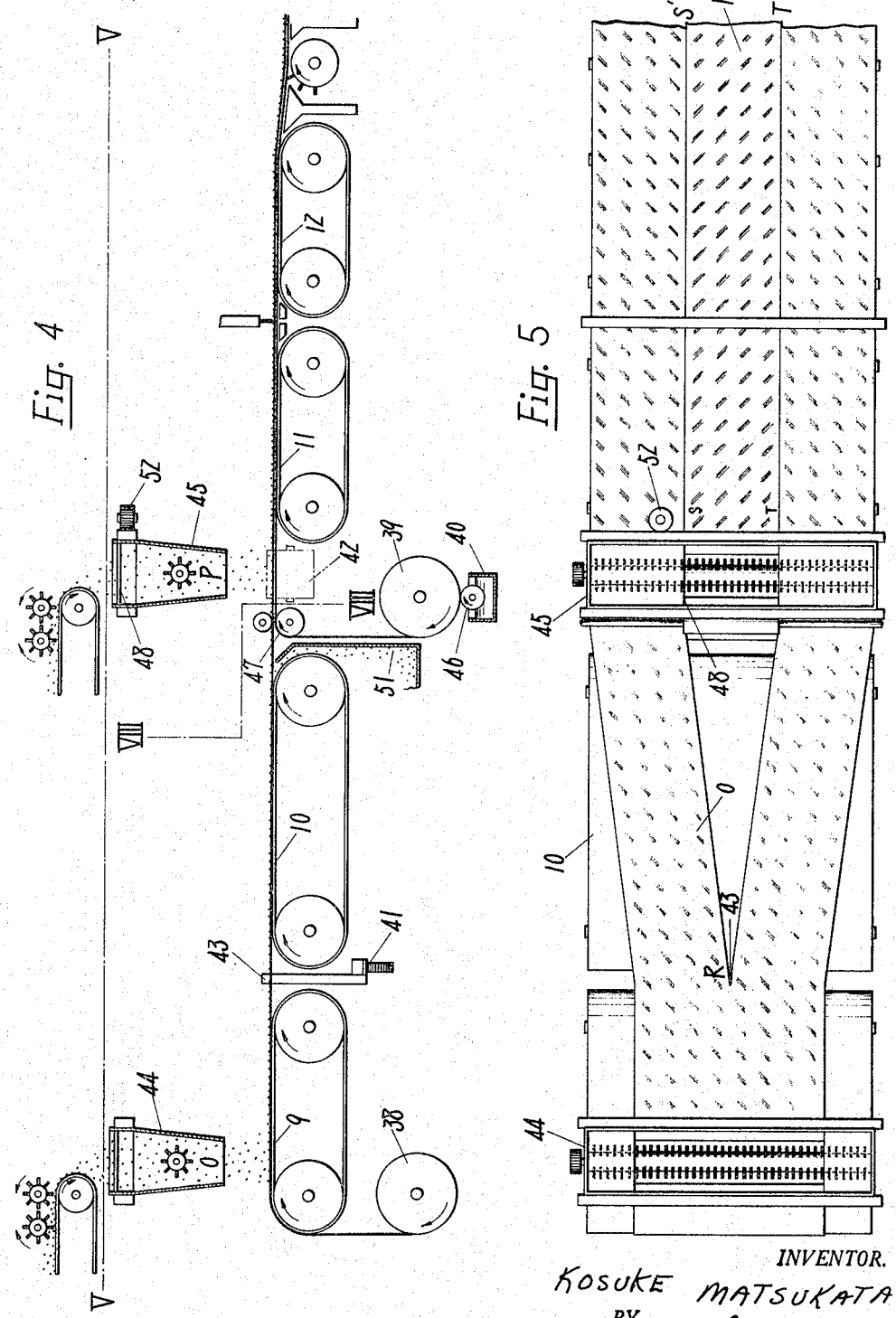

INVENTOR.
KOSUKE MATSUKATA
BY Wenderoth, Lind
and Ponack

United States Patent Office 3,301,726
Patented Jan. 31, 1967

3,301,726
METHOD AND APPARATUS FOR MAKING VARI-COLORED PARTICLE BOARD
Kosuke Matsukata, 390 Tsurumi-cho, Tsurumi-ku,
Yokohama, Japan
Filed Nov. 14, 1962, Ser. No. 237,604
Claims priority, application Japan, Nov. 16, 1961,
36/41,120
9 Claims. (Cl. 156—62.2)

Particle boards have been considered, in the past, to be articles in which the appearance is one of the characteristics, but as they were simple and had no varieties, the above characteristic was forgotten and they have been used as a simple constructional material.

This invention relates to a process and an apparatus for producing beautiful particle board which can be used as decorative materials as well as constructive materials, and which can meet the requirement of the modern economy. In the invention, many kinds of vari-colored patterns are formed on the particle boards by utilizing the coloring and dyeing properties of each wood or flax species in the particle boards.

There is a limit of aesthetic level to be arrived at in melamine coated decorative board (formica-type) or printed plywood. In melamine coated decorative board, when an article is placed on the melamine board, it makes an unpleasant and cheap sound owing to the hardness of the surface which is a characteristic of it. Also, as in the case of printed plywoods, there are no deep penetrating optical effects in melamine coated decorative board, owing to the simplicity of the colors printed on the sheet underneath the melamine surface. Further, when the surface is worn, it must be replaced by a new one because it is impossible to repolish the surface. Therefore, the use of melamine coated decorative board has been limited to utensils or wall boards in the kitchen and toilet.

In the invention of this application, where many different kinds of small particles of wood or flax are used the appearance of the particle board of this invention is affected by those wood or flax articles on the surface. Many kinds of patterns can be formed by a characteristic construction of the small particles of wood or flax which will present an appearance different from conventional plain mosaics, while the inherent qualities of wood or flax can be maintained in a good condition. Also, the particle board of this invention can be renovated by repolishing the surface when it is damaged through long or rough usage.

The assemblage of the small particles of wood or flax must be carefully selected since they may cause trouble owing to the differences of the adhesive properties of wood or flax particles when different species of wood or flax are used in the same board. In order to produce the best articles by using small colored particles of wood, it is preferable to use the process of an invention entitled "A Process for Producing Coloured Particle Board" (Japanese Patent No. 297,766) by the same inventor.

Additional objects, features and advantages of the present invention will be apparent from the following detailed discussion and the accompanying drawings wherein:

FIGURE 1 is a transverse sectional view of the apparatus of this invention.

FIGURE 2 is a sectional view taken on line II—II of FIGURE 1.

FIGURE 3 shows the changes of a vari-colored particle board on a base paper during the process of this invention.

FIGURE 4 is a transverse sectional view of the apparatus of this invention for manufacturing simple-colored articles.

FIGURE 5 is a sectional view taken on line V—V of FIGURE 4.

Figure 6:
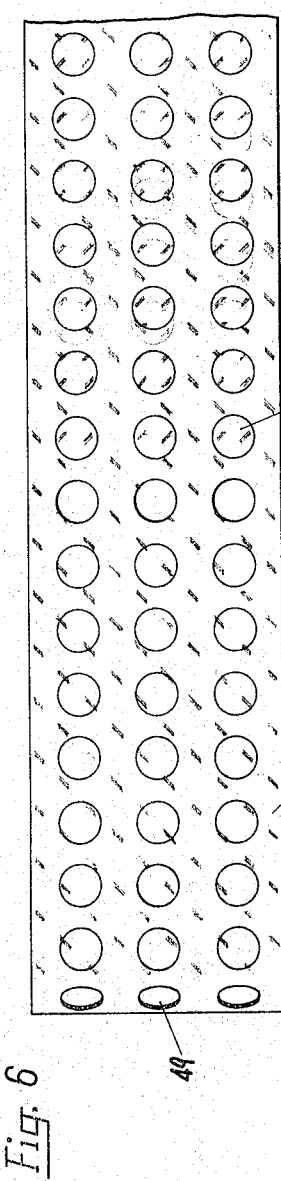
FIGURE 6 and FIGURE 7 show the articles produced by the apparatus.

The outline of this invention is as follows:

The processes for producing simple layered or triple layered particle boards have been known. In accordance with the present invention, one more layer of vari-colored particles of wood or flax is added on the surface of the conventional particle board or a specific vari-colored layer is prepared as a part of the surface layer. A series of devices for producing the specific surface layer is added to a conventional apparatus for producing particle boards. A specific surface layer is first placed on a stainless steel plate in a conventional forming frame for particle boards. On this layer are placed adhesive coated small pieces of wood or flax as usual. They are subjected to a pre-pressing and a multi-stage pressing and are later heated and pressed, and then are subjected to a surface finishing by a drum sander. A transparent coating may be then applied to the finished surface after they have been cut to size. In the production of a specific surface layer, kraft paper or cheap chemical sheet is made available. First a designated part of the kraft paper or such-like is partially cut out to allow the scattering of colored small pieces which are not intended to become component of the finished product to land directly on a first unit conveyor belt so that they move away with the belt which leaves the main conveyer line with the actuating end roller. On this cut out kraft paper or such-like, the first colored small pieces are partially retained. Prior to this reaching the second unit conveyer belt, another kraft paper from another source is placed beneath and is edgewise adhered to the first sheet and allows the second group of colored small pieces to be retained on the combined sheet. In this step, a specific mask is used above the main conveyor belt so that the second group of colored small pieces are concentrated on the designated region on the second kraft paper. This mask is synchronized with the main conveyer belt line.

When a pattern is simple the apparatus can be simplified in accordance with it. In FIGURE 1 to FIGURE 3, a general complicated case is shown, in FIGURES 4 and 5 the simplest case, and in FIGURE 6 to FIGURE 8 an apparatus and the products which result when producing an article with complicated splashed patterns.

With reference to the drawings, the process and the product of this invention will be explained in detail:

Referring to FIGURE 1, 1, 2 and 3 are kraft papers on which adhesive coated small pieces of different kinds of wood or flax are placed. A, B and C in FIGURE 3 have the same dimension as one sheet of 1, 2 and 3, with the parts a and b being cut out, and they are rolled in series around rollers 4, 5 and 6. The rate of rotation can be adjusted. The ground paper 1 having a part cut out as shown in FIG. 3(A) is placed on a belt 9 and moved to the position under a feeder 13, whereby one kind of the said small pieces K are spread on the ground paper. When the paper 1 reaches the edge of the belt 9, the said small pieces placed on the cut-out portions of the paper fall down along the belt 9 at a roller 17 while the ground paper moves in a horizontal plane as shown at 24. The said small pieces which fall from the belt are recovered by means of a small belt 25 placed at a right angle to the belt 9 and recycled to the feeder 9 through an inlet 29. The ground paper 2 is the one connecting a number of sheet B in FIGURE 3 in series, and is unrolled from a roller 5, coated with an adhesive by being passed through an adhesive bath 7, and having the edges attached to the lower side of the ground paper 1 at a roller 32 When the combined papers 1 and 2 are under a feeder 14, a mask 33 of a vinyl chloride sheet D having a pattern therein as shown at d in FIG. 3 is adjusted to pass through the feeder 14 in relation to the motion of the ground papers, whereby another kind of the said small pieces L fall on pre-determined parts of the ground papers. The said small pieces which have fallen on the cut-out parts of the ground paper B fall from the belt at the horizontal end 35 of the belt 10 at a roller 19 and are recovered by means of a small belt 26. The adhesive coated small pieces of wood or flax remaining on the mask 33 fall on a small belt 27 and are recovered. The same proceeding is used to apply small pieces of another kind of the said small pieces M and a ground paper 3. The ground paper shown as C in FIGURE 3 has no patterns. A mask 34 is made in the same manner as the mask 33 and having an aperture as shown at E in FIGURE 3. A small belt 28 and an adhesive bath 8 have the same function belt 27 and bath 7 as described above. The combined paper sheet 1, 2 and 3 on which the said small pieces K, L and M are placed is perforated by means of a perforator 36 and, when the sheet is brought into contact with a roller 37 having projections on part of the surface thereof and which is rotated faster than the rollers 16, 17, 18, 19, 20, 21, 22 and 23, a part of the sheet is cut off intermittently from the other and sent to the subsequent process.

In FIGURE 3, F, G and H show separately the states of the ground papers covered by the said small pieces of various kinds of particles K, L and M immediately before they move to the next process. The rollers 29, 30 and 31 are rotated in the opposite direction to the rotation of the belts to prevent an excessive number of small pieces from entering the feeders, and rollers 20', 30', and 31' are rotated in the same direction as the rotation of the belts, helping the spreading of small pieces.

Figure 7:
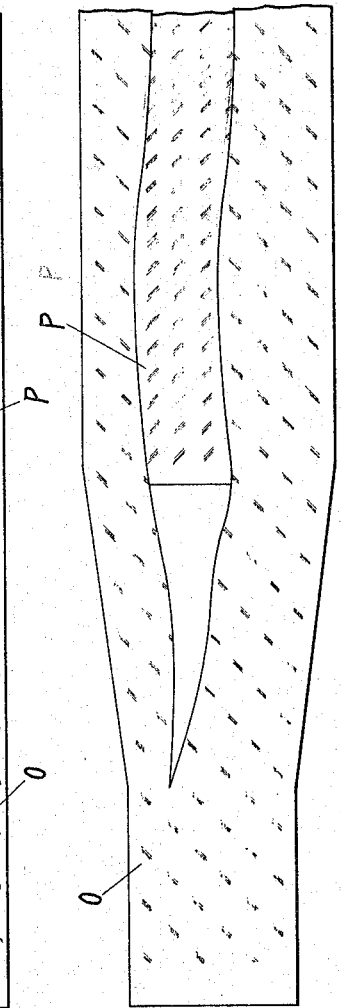

Referring to FIGURE 4, a simplified apparatus similar to that of FIGURE 1 is shown for producing articles having simple patterns as shown in FIGURE 5, FIGURE 6 and FIGURE 7. When producing an article as shown in FIGURE 5, a base paper on a roller 38 is preliminarily cut lengthwisely at a position R (FIGURE 5) which is determined by the positions of SS' and TT' in FIGURE 5. When the base paper passes under the first feeder 44 for the said small pieces O, the small pieces O are spread on the base paper and the base paper is separated into two sheets by means of a separator 43. The separator 43 is connected with a motor 41, which is synchronized with a motor 52 driving to a feed-controller frame 48 of the second feeder 45. Around the roller 39 is rolled kraft paper or the like having a width slightly wider than the distance between edges SS' and TT' and which paper has an adhesive applied thereto by means of coating roller 46 in adhesive bath 40 and has the edges adhered to the two sheets spread with small pieces O by a roller 47 to form a bridging paper between the sheets. Under the second feeder 45, other small pieces are spread on only the bridging paper by means of the feed-controller frame 48. When producing an article as shown in FIGURE 7, the cutter 43 is adjusted to be synchronized with the feed-controller frame 48.

Figure 8:
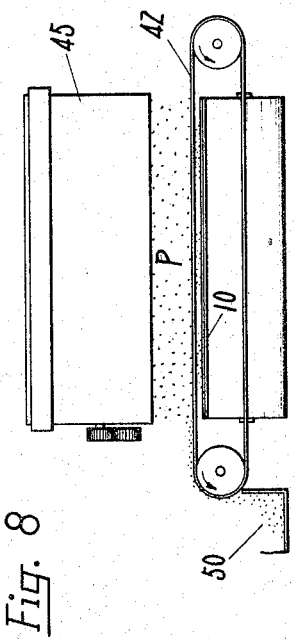
FIGURE 8 is a sectional view of the apparatus for making a pattern sheet when producing the article of FIGURE 6.

When producing an article shown in FIGURE 6, a required pattern 49 is first cut in the kraft base paper. The cutter 43 is removed. As shown in FIGURE 8, a transverse belt 42 of a vinyl chloride sheet or a cloth having equivalent portions cut out of it is moved in synchronization with the main line of operation and at a right angle thereto. After the first kind of small pieces is spread by feeder 44, another kind of small pieces is spread by the second feeder 45 through the above belt 42 and fills the unoccupied space on the kraft base paper, thus producing the required surface layer.

The final products thus produced are now placed on a stainless steel sheet placed at the bottom of the forming frame of a conventional particle board forming apparatus to become the top layer of the particle board. After the board is pressed under heat, the board is drum-sanded and the kraft paper is removed altogether and thus leaving the complete vari-colored board.

I claim:

1. A process for producing varicolored particle boards, comprising spreading small colored particles of a first color scheme on one face of a first base sheet having at least one aperture therein which has the shape of the area of the particle board which is to be occupied by particles of another color scheme, adhering at least one further base sheet to the other face of the first base sheet with at least part of said further base sheet exposed through at least a part of said at least one aperture in said first base sheet, spreading small colored particles of at least one further color scheme on the parts of said further base sheet exposed through the aperture in said first base sheet, and then spreading a further layer of particle board material over the previously spread layers of particles and coextensive with said first base sheet, removing the base sheets, and smoothing the surface of the thus formed particle board from which the base sheets have been removed.

2. A process as claimed in claim 1 in which the particles are wood particles.

3. A process as claimed in claim 1 in which the particles are flax particles.

4. A process as claimed in claim 1 in which the particles are a mixture of wood particles and flax particles.

5. A process as claimed in claim 1 in which the step of spreading the small colored particles comprises sprinkling the particles onto the base sheets, the particles which fall through the apertures in the base sheets being collected and removed from beneath the base sheet through which they have fallen before a further base sheet is adhered to the base sheet through which the particles have fallen.

6. A process for producing varicolored particle boards, comprising spreading small colored particles of a first color scheme on one face of a first base sheet having a plurality of apertures therein which have the shape of areas of the particle board which are to be occupied by particles of another color scheme, adhering at least one further base sheet to the other face of the first base sheet with at least a part of the said further base sheet exposed through at least a part of at least some of the apertures in said first base sheet, masking the parts of the first base sheet already having colored particles spread thereon while spreading small colored particles of at least one further color scheme on the parts of said further base sheet exposed through the apertures in said first base sheet, and then spreading a further layer of particle board material over the previously spread layers of particles and coextensive with said first base sheet, removing the base sheets, and smoothing the surface of the thus formed particle board from which the base sheets have been removed.

7. A process for producing varicolored particle boards, comprising spreading small colored particles of a first color scheme on one face of a first base sheet having a plurality of apertures therein which have the shape of areas of the particle board which are to be occupied by particles of another color scheme, adhering at least one further base sheet to the other face of the first base sheet with a part of said further base sheet exposed through at least a part of at least some of the apertures in said first base sheet, masking the parts of the first base sheet already having colored particles spread thereon while spreading small colored particles of at least one further color scheme on the parts of said further base sheet exposed through the apertures in said first base sheet, adhering a final base sheet to the last of said further base sheets, said final base sheet being exposed through the apertures remaining unfilled in any of said base sheets, masking the parts of the base sheets other than the final base sheet which have been covered with colored particles while spreading small colored particles of a final color scheme on the parts of said final base sheet which are exposed, and then spreading a further layer of particle board material over the previously spread layers of particles and coextensive with said first base sheet, removing the base sheets, and smoothing the surface of the thus formed particle board from which the base sheets have been removed.

8. A process for producing varicolored particle boards, comprising spreading small colored particles of a first color scheme on one face of a first base sheet, dividing said first base sheet into at least two parts in the direction of its length, adhering at least one further base sheet to the edges of said first base sheet along the opposed edges of the said at least two parts, spreading small colored particles of at least one further color scheme on the said further base sheet exposed between the parts of said first base sheet, and then spreading a further layer of particle board material over the previously spread layers of particles and coextensive with said first base sheet, removing the base sheets, and smoothing the surface of the thus formed particle board from which the base sheets have been removed.

9. An apparatus for producing a surface layer for a varicolored particle board, comprising means for conveying a first base sheet having at least one aperture therein along a path, means positioned above the said path for spreading small colored particles of a first color scheme on the face of said first base sheet, means for conveying at least one further base sheet toward and along the path of the first base sheet in abutment with the lower surface of said first base sheet, adhesive applying means adjacent said last mentioned conveying means for coating the said further base sheet with an adhesive, and a further means for spreading small colored particles of at least one further color scheme on the parts of said further base sheet exposed through the aperture in said first base sheet.

References Cited by the Examiner

UNITED STATES PATENTS

| Re. 20,617 | 1/1938 | Caldwell | 264—73 |
| 2,770,080 | 11/1956 | Hoyt | 156—153 X |

FOREIGN PATENTS

| 809,323 | 2/1959 | Great Britain. |

EARL M. BERGERT, *Primary Examiner.*

P. R. WYLIE, W. E. HOAG, *Assistant Examiners.*